US009720236B2

(12) United States Patent
Yokoyama

(10) Patent No.: US 9,720,236 B2
(45) Date of Patent: Aug. 1, 2017

(54) OPTICAL ELEMENT, ELECTRO-OPTICAL DEVICE, AND MOUNTED DISPLAY APPARATUS

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/922,491

(22) Filed: Oct. 26, 2015

(65) Prior Publication Data

US 2016/0124229 A1 May 5, 2016

(30) Foreign Application Priority Data

Oct. 29, 2014 (JP) ................... 2014-220034

(51) Int. Cl.
*G02B 27/01* (2006.01)
*G02B 27/42* (2006.01)
*G02B 6/34* (2006.01)
*F21V 8/00* (2006.01)

(52) U.S. Cl.
CPC ......... *G02B 27/0172* (2013.01); *G02B 6/005* (2013.01); *G02B 27/4205* (2013.01); *G02B 27/4272* (2013.01); *G02B 6/34* (2013.01); *G02B 2027/0123* (2013.01); *G02B 2027/0178* (2013.01)

(58) Field of Classification Search
USPC .................................. 359/618, 629–634, 636
See application file for complete search history.

(56) References Cited

U.S. PATENT DOCUMENTS

| 5,742,262 | A | 4/1998 | Tabata |
| 7,643,214 | B2 | 1/2010 | Amitai |
| 8,189,263 | B1* | 5/2012 | Wang ............... G02B 27/0172 359/630 |
| 2006/0181769 | A1 | 8/2006 | Kumasawa et al. |
| 2009/0015929 | A1* | 1/2009 | DeJong .............. G02B 27/0081 359/633 |
| 2009/0190222 | A1 | 7/2009 | Simmonds et al. |

(Continued)

FOREIGN PATENT DOCUMENTS

| JP | H07-72422 A | 3/1995 |
| JP | 2006-227581 A | 8/2006 |
| JP | 2013-061480 A | 4/2013 |

*Primary Examiner* — Kimberly N Kakalec
(74) *Attorney, Agent, or Firm* — Oliff PLC

(57) ABSTRACT

An optical element includes a light guide is provided with a incidence section and a emission section, a semitransmissive reflective film is provided in the inside of the light guide, a first diffraction element is provided in the incidence section, and is provided with a plurality of gratings, a second diffraction element is provided in the emission section, and is provided with a plurality of gratings, and a reflective film is provided in the incidence section in a periphery of the first diffraction element, in which the pitch of the plurality of gratings of the first diffraction element is equivalent to the pitch of the plurality of gratings of the second diffraction element, and each extension direction of the plurality of gratings of the first diffraction element is the same direction as each extension direction of the plurality of gratings of the second diffraction element.

15 Claims, 10 Drawing Sheets

(56) References Cited

U.S. PATENT DOCUMENTS

| | | | |
|---|---|---|---|
| 2010/0214659 A1* | 8/2010 | Levola | G02B 5/1814 359/566 |
| 2010/0284085 A1* | 11/2010 | Laakkonen | G02B 6/12007 359/575 |
| 2011/0235179 A1* | 9/2011 | Simmonds | G02B 6/34 359/567 |
| 2012/0119978 A1* | 5/2012 | Border | G02B 27/0172 345/8 |
| 2013/0250380 A1* | 9/2013 | Fujikawa | G02B 27/0172 359/13 |
| 2014/0192418 A1 | 7/2014 | Suzuki | |

* cited by examiner

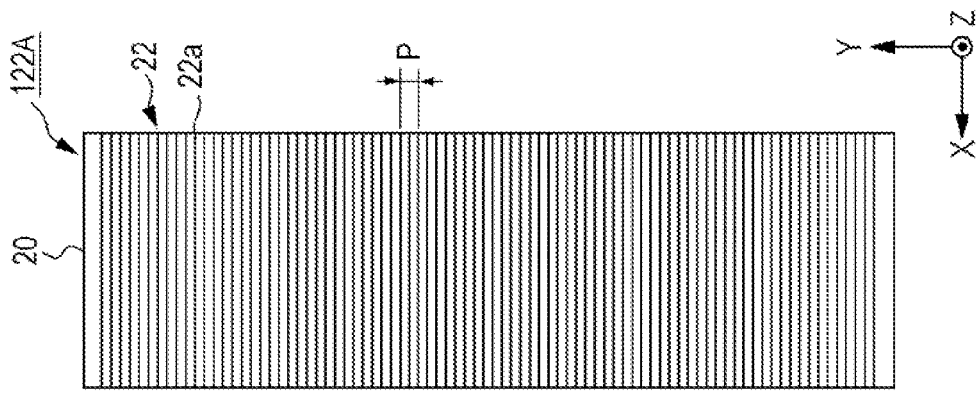
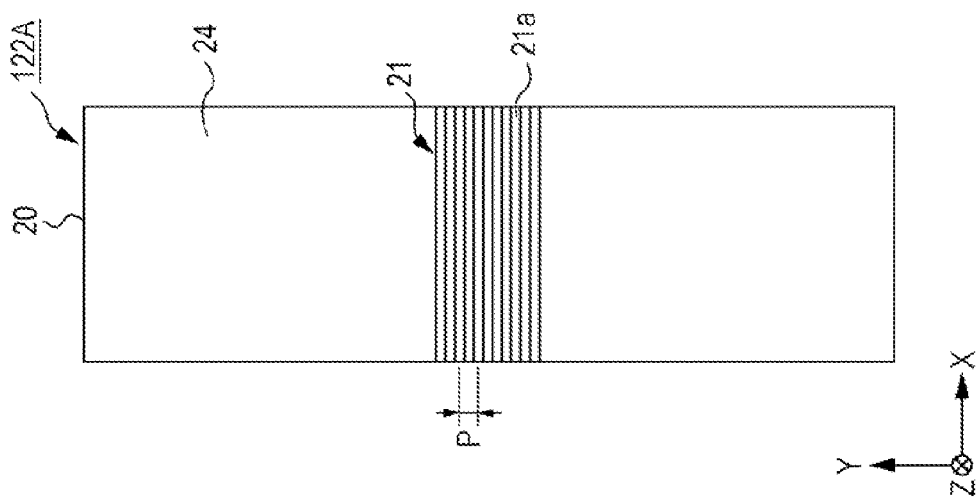
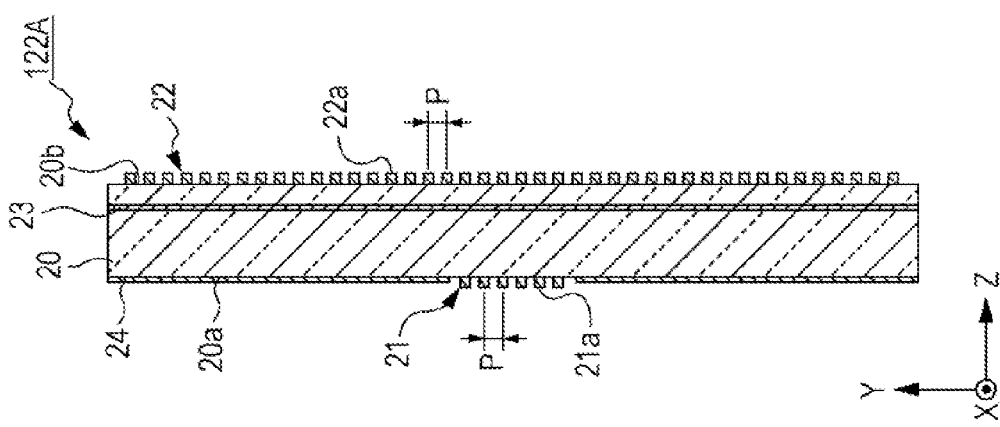

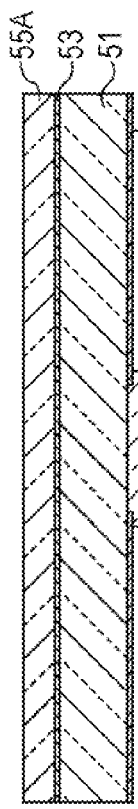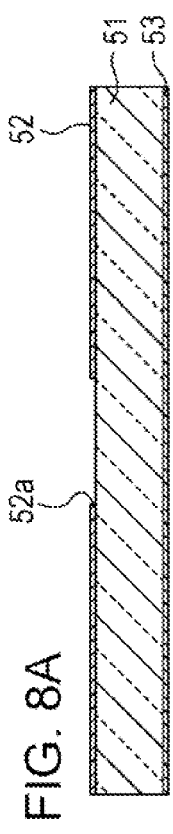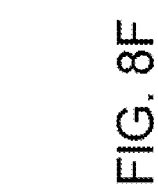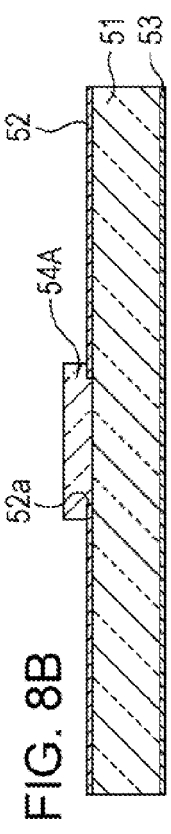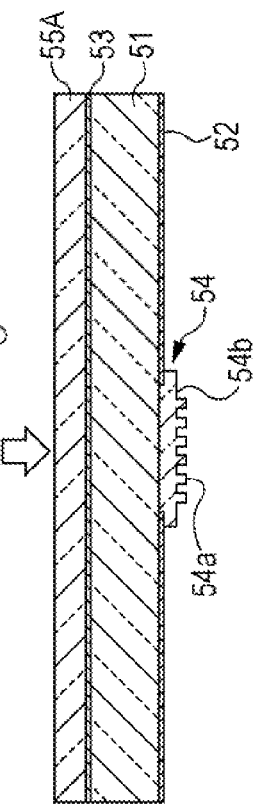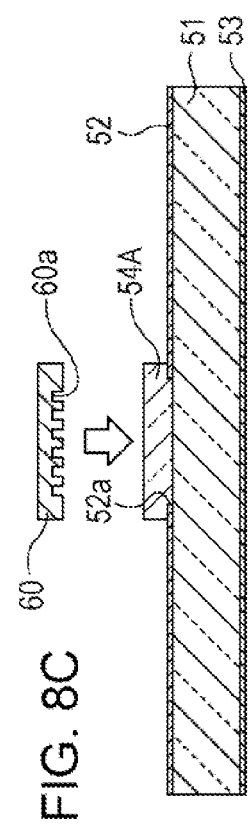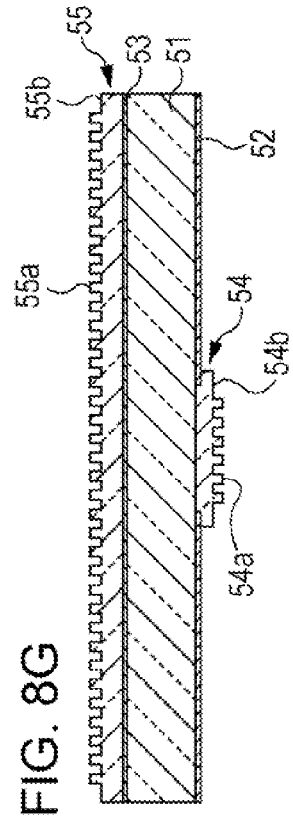

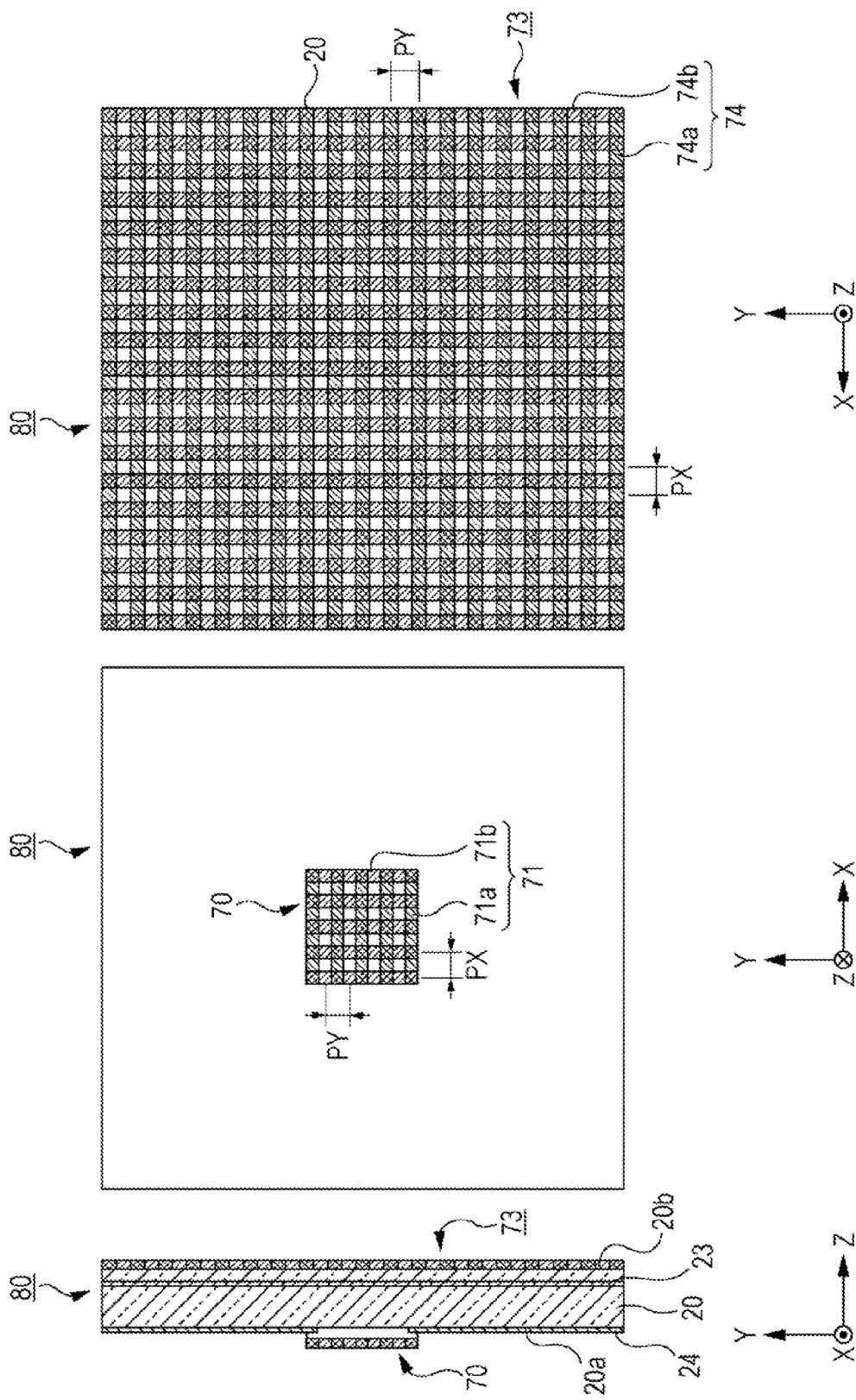

OPTICAL ELEMENT, ELECTRO-OPTICAL DEVICE, AND MOUNTED DISPLAY APPARATUS

BACKGROUND

1. Technical Field

The present invention relates to an optical element, an electro-optical device, and a mounted display apparatus.

2. Related Art

In recent years, mounted display apparatus such as head mounted displays have attracted attention. In such head mounted display, adjustment that exactly matches a display position of an image to a position of a pupil becomes necessary if images are smaller than a pupil diameter, and therefore, since usability is worsened, optical elements that enlarge image light beyond the pupil diameter are used. As such an optical element, a technology that enlarges image light by using two diffraction gratings, is known (for example, refer to JP-A-07-72422).

Incidentally, miniaturization is highly regarded in head mounted displays, and the miniaturization of devices has been realized by drawing images on the retina of the eye by scanning with a laser beam. In such an instance, the combined use of the abovementioned optical elements in a laser scanning method has been considered.

However, in a method that scans using a fine laser beam, since the image light becomes considerably small in comparison with pupil diameter, it is difficult to sufficiently enlarge the image light in the abovementioned optical elements. In such an instance, even in a case in which the image light is sufficiently smaller than pupil diameter in the manner of a method that scans with a laser beam, the provision of a new technology that can cause image light to be incident to a pupil is desired.

SUMMARY

An advantage of some aspects of the invention is to provide an optical element that is capable of enlarging image light and causing the image light to be incident to a pupil, an electro-optical device, a mounted display apparatus, and a manufacturing method of an optical element.

According to an aspect of the invention, there is provided an optical element including a first light guide that is provided with a first incidence section and a first emission section, a semitransmissive reflective film that is provided in the inside of the first light guide, a first diffraction element that is provided in a section of the first incidence section, and is provided with a plurality of gratings, which are arranged at a predetermined pitch, a second diffraction element that is provided in at least a section of the first emission section, and is provided with a plurality of gratings, which are arranged at a predetermined pitch, and a reflective film that is provided in the first incidence section in a periphery of the first diffraction element, in which the pitch of the plurality of gratings of the first diffraction element is provided so as to be equivalent to the pitch of the plurality of gratings of the second diffraction element, and each extension direction of the plurality of gratings of the first diffraction element is provided so as to be the same direction as each extension direction of the plurality of gratings of the second diffraction element.

In this case, as a result of the arrangement pitches (grating periods) of the grating patterns being the same, and using two diffraction gratings in which the extension directions of the gratings are the same, it is possible to create a plurality of rays of diffracted light that is emitted at the same angle as an incidence angle.

In addition, a portion of light that reaches the semitransmissive reflective film is transmitted and emitted at the same angle as the incidence angle by the second diffraction element. Meanwhile, light that is reflected by the semitransmissive reflective film is reflected by the reflective film that is formed in the first incidence section of the first light guide and reaches the semitransmissive reflective film again. Accordingly, light that propagates through the first light guide and reaches the second diffraction element is sequentially emitted at the same angle as the incidence angle while being repeatedly reflected by the semitransmissive reflective film and the reflective film.

Therefore, for example, by emitting image light from the first emission section in an enlarged state, it is even possible to cause enlarged image light to be incident to a pupil in a case in which fine rays of light such as laser beams are incident to the first incidence section.

In the optical element, the semitransmissive reflective film may be provided so as to be parallel to a surface of the first incidence section and a surface of the first emission section.

In this case, since the semitransmissive reflective film is disposed parallel to a surface of the first incidence section and a surface of the first emission section, a propagation angle inside the light guide, which corresponds to the incidence angle, is retained, and therefore, it is possible to cause light, which is repeatedly reflected by the semitransmissive reflective film and the reflective film, to be incident to the second diffraction element at the same angle and extract the light to the outside.

In the optical element, the plurality of gratings of the first diffraction element may be arranged along a first direction, the plurality of gratings of the second diffraction element may be arranged along the first direction, and a size of the second diffraction element along the first direction may be greater than the size of the first diffraction element along the first direction.

In this case, it is possible to enlarge light that is incident from the first incidence section in the first direction.

According to another aspect of the invention, there is provided an optical element including a first light guide that is provided with a first incidence section and a first emission section, a semitransmissive reflective film that is provided in the inside of the first light guide, a first diffraction element that is provided in a section of the first incidence section, and is provided with a plurality of gratings, which are respectively arranged at a predetermined pitch so as to extend along a first direction and a second direction, which is a direction that intersects the first direction, a second diffraction element that is provided in at least a section of the first emission section, and is provided with a plurality of gratings, which are respectively arranged at a predetermined pitch so as to extend along the first direction and the second direction, and a reflective film that is provided in the first incidence section in a periphery of the first diffraction element, in which the pitch of the plurality of gratings of the first diffraction element along the first direction is provided so as to be equivalent to the pitch of the plurality of gratings of the second diffraction element along the first direction, the pitch of the plurality of gratings of the first diffraction element along the second direction is provided so as to be equivalent to the pitch of the plurality of gratings of the second diffraction element along the second direction, and a size of the second diffraction element is greater than the size of the first diffraction element.

In this case, since the first diffraction element and second diffraction element, which is larger than the first diffraction element, respectively have two-dimensional grating patterns, it is possible to enlarge light in a two-dimensional direction. Therefore, for example, by emitting image light from the first emission section in a state of being enlarged in the two-dimensional direction, it is even possible to cause enlarged image light to be incident to a pupil in a case in which fine rays of light such as laser beams are incident to the first incidence section.

In the optical element, the reflectance of the semitransmissive reflective film may gradually decrease with separation from a central optical axis of the first diffraction element.

In this case, the transmittance of the semitransmissive reflective film gradually increases with separation from a central optical axis of the first diffraction element. Accordingly, as a result of returning as much light that propagates through the first light guide as possible when light is reflected by the semitransmissive reflective film, it is possible for a large amount of light to remain in the light guide member even if light is separated from the central optical axis of the first diffraction element. In addition, it is possible to transfer a larger amount of light that remains in the first light guide to the second diffraction element, and therefore, it is possible to suppress deteriorations in emitted light intensity even if light is separated from the central optical axis of the first diffraction element.

In the optical element, the semitransmissive reflective film may be configured from a dielectric multilayered film.

In this case, since it is possible to suppress the absorption of light in comparison with a metal reflective film, it is possible to suppress deteriorations in light intensity when light is repeatedly reflected inside the first light guide.

In the optical element, the optical element may further include a resin layer that is disposed between the second diffraction element and the semitransmissive reflective film.

In this case, the resin layer functions as a spacer that separates the semitransmissive reflective film and the second diffraction element. Accordingly, the second diffraction element can favorably extract light that is transmitted through the semitransmissive reflective film to the outside by diffracting the light.

According to still another aspect of the invention, there is provided an electro-optical device including an image projection section that includes an image generation section that emits image light, a second light guide, which includes a second incidence section and a second emission section that are formed on one surface side of the second light guide, and which guides light that is input from the second incidence section, and outputs the light from the second emission section, and the optical element according to the abovementioned aspects, which is disposed facing the second incidence section, and to which the image light from the image generation section is incident.

In this case, since the electro-optical device includes an image projection section that emits image light that is enlarged by the abovementioned optical element, adjustment that exactly matches a position of the image light to a position of a pupil is unnecessary, and therefore, it is possible to provide an electro-optical device with high display quality, high reliability and excellent usability.

In the electro-optical device, the optical element may be disposed in a state in which the first emission section is inclined with respect to a surface of the second incidence section.

In this case, for example, as a result of disposing a diffraction optical element in an inclined manner, it is even possible to efficiently guide light to the inside of the second light guide in a case in which the second incidence section is angle-dependent on incidence light.

According to still another aspect of the invention, there is provided a mounted display apparatus including the electro-optical device according to the abovementioned aspect, and a mounting section.

In this case, since it is possible to mount the abovementioned electro-optical device, adjustment that exactly matches a position of image light to a position of a pupil is unnecessary, and therefore, it is possible to provide a mounted display apparatus with high display quality, high reliability and excellent usability.

BRIEF DESCRIPTION OF THE DRAWINGS

The invention will be described with reference to the accompanying drawings, wherein like numbers reference like elements.

FIGS. 3A to 3C are views that show a configuration of an optical element.

FIGS. 8A to 8G are process views that show a manufacturing method of an optical element according to the second embodiment.

FIGS. 10A to 10C are views that show a configuration of an optical element according to a fourth embodiment.

DESCRIPTION OF EXEMPLARY EMBODIMENTS

Hereinafter, embodiments of the invention will be described in detail with reference to the drawings. Additionally, there are cases in which the drawings that are used in the following description are displayed with portion that form features enlarged for convenience in order to make the features easy to understand, and the dimensional ratios and the like of each constituent element are not necessarily the same as in practice.

Embodiment 1

Figure 1:
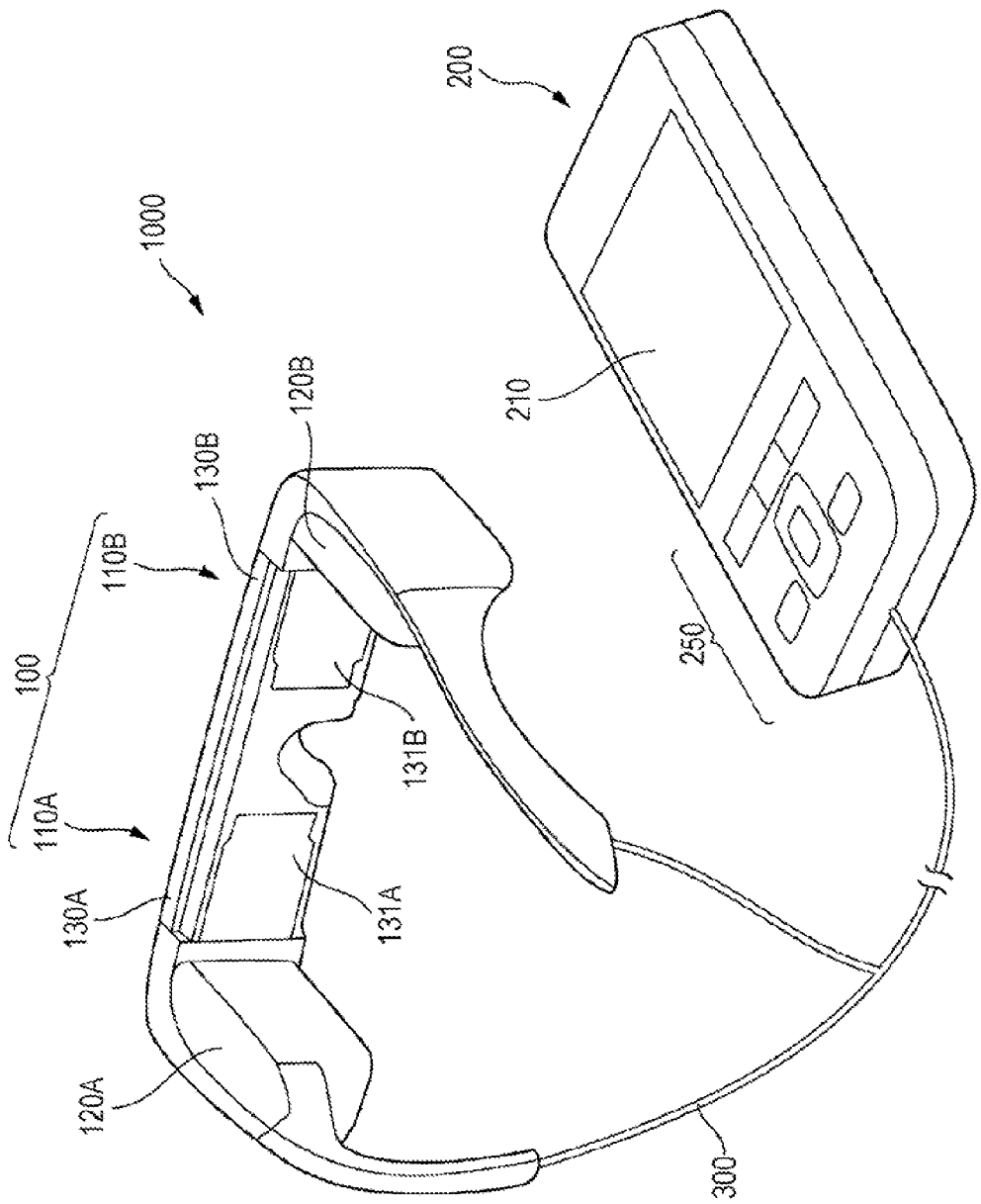
FIG. 1 is an external view of an electro-optical device according to a first embodiment.

FIG. 1 is an external view of an electro-optical device according to the present embodiment. In the present embodiment, a transmission type head mounted display (a mounted display apparatus 1000) is shown as the electro-optical device. The mounted display apparatus 1000 includes an optical element, which is an aspect of the invention. In the following description, head mounted display is abbreviated to HMD.

The mounted display apparatus 1000 according to the present embodiment is a see-through type (transmission type head mounted display) HMD, which is provided with a main body section (a mounting section) 100 that has a glasses-type shape, and a control unit 200 that has a size of an extent that is capable of being held in a users hand. According to the mounted display apparatus 1000 of the present embodiment, it is possible for a user to view images that are created by an image display section, and it is also possible to for the user to view external scenery.

The main body section 100 and the control unit 200 are communicably connected in either a wired or a wireless manner. In the present embodiment, the main body section 100 and the control unit 200 are communicably connected by a cable 300. Further, the main body section 100 and the control unit 200 perform communication of image signals and control signals via the cable.

The main body section 100 is provided with a left eye display section 110A and a right eye display section 110B.

The left eye display section 110A is provided with an image formation section 120A that forms image light of left eye images, and a light guide unit 130A that guides the image light of left eye images.

The image formation section 120A is accommodated in the glasses type main body section 100 in a sidepiece portion of the glasses, and the light guide unit 130A is accommodated in the glasses type main body section 100 in a glasses lens portion.

A viewing section 131A, which is optically transmissive, is provided in the light guide unit 130A. The light guide unit 130A emits image light of left eye images that propagates through the inside of the light guide unit 130A, to a left eye of a user from the viewing section 131A. In addition, in the mounted display apparatus 1000, the viewing section 131A is optically transmissive, and a periphery can be viewed through the viewing section 131A.

Meanwhile, the right eye display section 110B is provided with a right eye image formation section 120B, a right eye light guide unit 130B, and a right eye viewing section 131B. The left eye display section 110A and the right eye display section 110B adopt the same configurations, and have configurations that are bilaterally symmetrical with respect to a center (the approximate vicinity of a nose) of the glasses type main body section 100.

The control unit 200 is provided with a manipulation section 210 and a manipulation button section 250. A user performs instruction to the main body section 100 by performing manipulation input to the manipulation section 210 and the manipulation button section 250 of the control unit 200. Additionally, in the following drawings, description is given using an XYZ coordinate system as appropriate. In this case, an X direction corresponds to a horizontal direction in the mounted display apparatus 1000 in a state of being mounted on a user, a Y direction corresponds to a perpendicular direction (a vertical direction), and a Z direction is a direction that is orthogonal to the X direction and the Y direction and corresponds to a front-back direction of a user.

Figure 2:
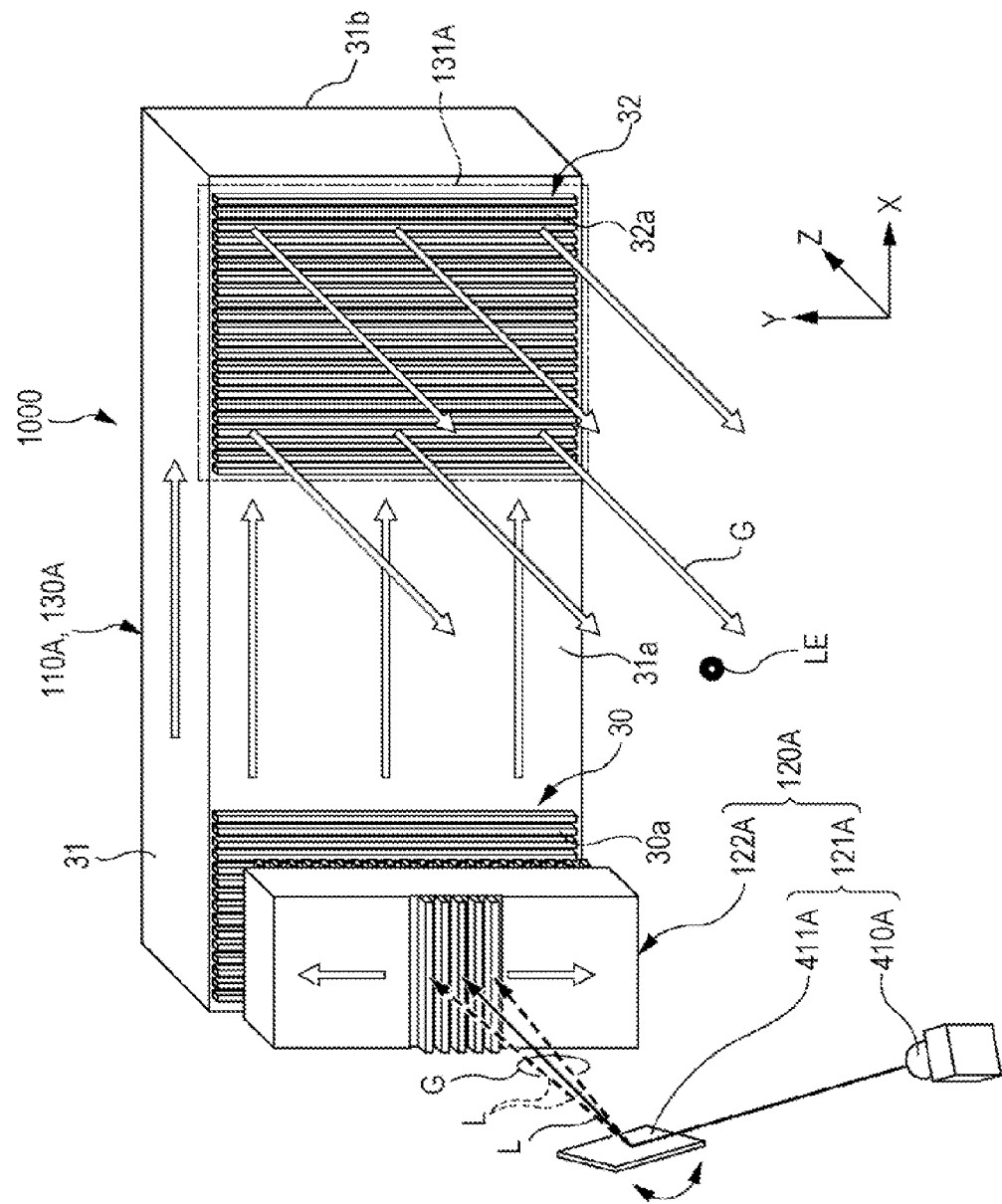
FIG. 2 is a plan view that shows a configuration example of a left eye display section of a display device.

FIG. 2 is a plan view that shows a configuration example of the left eye display section 110A of the mounted display apparatus 1000 according to an embodiment of the invention. In FIG. 2, a left eye LE of a user on which the main body section 100 is mounted, is shown. In this instance, only a configuration example of the left eye display section 110A is described.

The image formation section 120A and the light guide unit 130A that are shown in FIG. 2 correspond to an image projection device of the invention. The image formation section 120A corresponds to an image projection section of the invention.

The image formation section 120A is provided with a left eye image light creation section 121A and an optical element 122A. The image light creation section 121A includes a left eye light source 410A and a left eye MEMS mirror 411A. In the present embodiment, the light source 410A includes a plurality of laser light sources that emit blue (B), green (G) and red (R) laser light L. The MEMS mirror 411A is a micromirror that causes the laser light L to be incident to the optical element 122A by reflecting the laser light L.

A relative position of the light guide unit 130A with respect to the image formation section 120A is fixed, and light that is emitted from the image formation section 120A is guided to a predetermined position of the light guide unit 130A.

Next, a summary of the mounted display apparatus 1000 according to the present embodiment will be described with reference to FIG. 1 and FIG. 2.

Firstly, an image signal is input to the image light creation section 121A from the control unit 200. The image light creation section 121A forms image light G by scanning with the laser light L and causing the laser light L that is emitted from the light source 410A to be incident to the optical element 122A in a temporally sequential manner using the MEMS mirror 411A.

As a result of this, the image light creation section 121A creates image light G that corresponds to the image signal, and emits the image light G to the optical element 122A. In this manner, in the present embodiment, the image light G is configured by the MEMS mirror 411A scanning with the laser light L. Therefore, the image light G is incident to the optical element 122A in a state in which a predetermined amplitude (vibration angle) is kept.

The optical element 122A enlarges the input image light G and outputs the image light G toward the light guide unit 130A.

The light guide unit 130A includes a light input section 30, a light guide body (a second light guide body) 31, and a light output section 32. A surface relief type diffraction element 30a is provided in the light input section 30. In addition, a surface relief type diffraction element 32a is also provided in the light output section 32.

The optical element 122A is disposed facing the light input section 30 of the light guide unit 130A.

In this instance, the state of the optical element 122A facing the light input section 30 is not limited to a circumstance in which a surface of a second diffraction section 22 of the optical element 122A and a surface of the light input section 30 (the diffraction element 30a) are disposed in parallel, and includes a circumstance in which a surface of the second diffraction section 22 and a surface of the diffraction element 30a are disposed inclined toward one another.

In the present embodiment, for example, the optical element 122A is disposed facing the light guide unit 130A in a manner in which a surface of the second diffraction section 22 is parallel to a surface of the diffraction element 30a of the light guide unit 130A. That is, in the present embodiment, the surface of the second diffraction section 22 and the surface of the diffraction element 30a are not inclined with respect to one another.

Additionally, in the diffraction element 30a, a propagation angle range of light that is propagated through the inside of the light guide body 31 in total reflection changes depending on an angle with which light is input. Therefore, the present embodiment is not limited to the abovementioned aspect, and the surface of the second diffraction section 22 may be set to be disposed in an inclined state with respect to the surface of the diffraction element 30a. If such a configuration is adopted, it is possible to change the size in the horizontal direction (the X direction) of the image light G that is extracted from the second diffraction section 22 by adjusting an inclination angle.

The light guide body 31 is a transparent right-angled parallelepiped member that includes a first surface 31a and a second surface 31b that extend facing one another. The light guide body 31 guides the image light G that is captured by the light input section 30, which is provided on one end side (a minus X direction side) of the first surface 31a, while causing the image light G to be totally reflected at the first surface 31a and the second surface 31b. The image light G propagates through the inside of the light guide body 31 as a result of being totally reflected at the first surface 31a and the second surface 31b, and is emitted from the light output section 32, which is provided on the other end side (a plus X direction side) of the first surface 31a.

FIGS. 3A to 3C are explanatory diagrams that describe focusing in the optical element 122A that is included in the image formation section 120A of FIG. 2 only, FIG. 3A is a cross-sectional view of the optical element 122A, FIG. 3B is a plan view in which the optical element 122A is viewed from a light incidence surface side, and FIG. 3C is a plan view in which the optical element 122A is viewed from a light emission surface side.

As shown in FIG. 3A, the optical element 122A of the present embodiment includes a light guide plate (light guide body) 20, a first diffraction section (a first diffraction element) 21, the second diffraction section (a second diffraction element) 22, a half mirror (a semitransmissive reflective film) 23, and a mirror (a reflective film) 24.

The light guide plate 20 is a transparent right-angled parallelepiped member that includes a first surface 20a and a second surface 20b that extend facing one another. As long as the material is transparent, the light guide plate 20 can use either an inorganic material or an organic material. Additionally, the first surface 20a is a light incidence surface of the present embodiment, and the second surface 20b is a light emission surface of the present embodiment.

The half mirror 23 is provided in the inside of the light guide plate 20. In this instance, the light guide plate 20 is, for example, pasted together with two optically transmissive substrates, and the half mirror 23 is formed at an interface between the two substrates.

The half mirror 23 is formed in a surface along an XY plane that is parallel to the first surface 20a and the second surface 20b. As a result of this, the first surface 20a, the second surface 20b and the surface of the half mirror 23 are disposed so as to be mutually parallel to one another. Accordingly, by retaining a propagation angle inside the light guide plate 20 that corresponds to an incidence angle, it is possible to cause light, which is repeatedly reflected by the half mirror 23 and the mirror 24, to be incident to the second diffraction section 22 at the same angle and extract the light to the outside.

As the half mirror 23, and the mirror 24, it is possible to use a metal film or a dielectric multilayered film, and a multilayered film in which a dielectric film and a metal film are mixed. In the present embodiment, for example, the half mirror 23 is formed using a dielectric multilayered film, and the mirror 24 is formed using a metal film.

As shown in FIG. 3B, the first diffraction section 21 and the mirror 24 are provided on the first surface 20a of the light guide plate 20. The first diffraction section 21 is provided in a section (the center) of the first surface 20a in the Y direction.

The mirror 24 is formed on the first surface 20a so as to cover a region that surrounds the periphery of the first diffraction section 21, that is, a region that does not overlap with the first diffraction section 21 in a plan view.

As shown in FIG. 3C, in the light guide plate 20, the second diffraction section 22 is provided across the entire surface of the second surface 20b.

The first diffraction section 21 and the second diffraction section 22 are, for example, configured from surface relief type diffraction gratings. Additionally, the first diffraction section 21 and the second diffraction section 22 may be configured from a volume hologram that is produced by an interference exposure method using laser light, and since surface relief type diffraction gratings can generally retain a high diffraction efficiency across a wide incidence angle range, such as diffraction grating is suitable for the invention.

The first diffraction section 21 has a grating pattern (a first grating pattern) 21a that is configured by a plurality of linear gratings, which extend in the X direction, being disposed in the Y direction (a first direction), and a grating period (an arrangement pitch) thereof is P. The second diffraction section 22 has a grating pattern (a second grating pattern) 22a that is configured from a plurality of linear gratings, which extend in the X direction in the same manner as the first diffraction section 21. The grating period of the grating pattern 22a is the same P as that of the first diffraction section 21. In a state of viewing in plan view, the size of the grating pattern 22a in the Y direction is larger than the size of the grating pattern 21a in the Y direction. Additionally, the depth of the grating patterns is determined as appropriate depending on a wavelength that is used and a required diffraction efficiency.

That is, in the first diffraction section 21 and the second diffraction section 22 of the present embodiment, the respective arrangement pitches of the grating patterns 21a and 22a are mutually equivalent with one another, and the respective extension directions (the X direction) of the gratings that configure the grating patterns 21a and 22a mutually coincide with one another.

Figure 4:
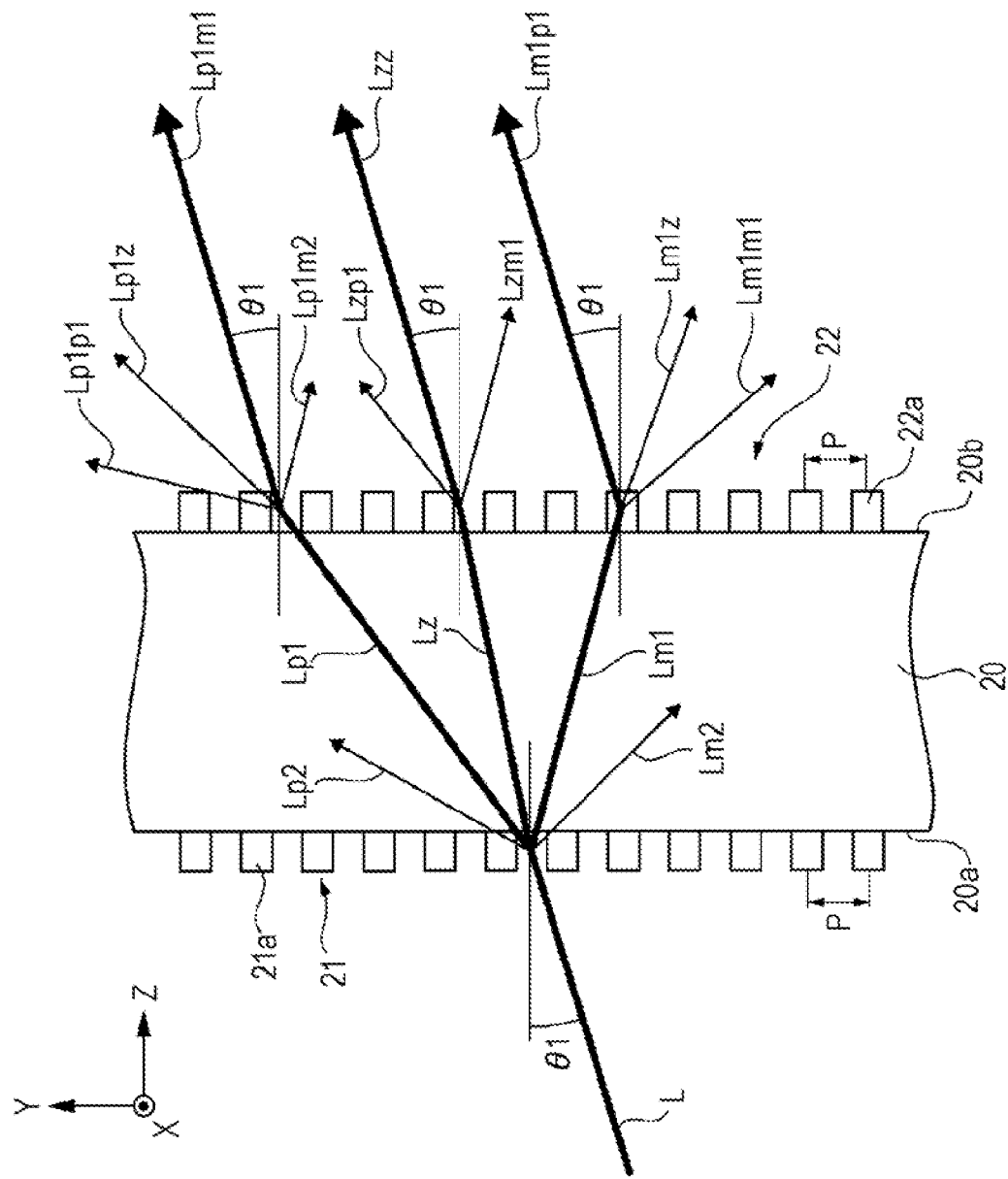
FIG. 4 is an explanatory diagram of diffraction functions of the first diffraction section and the second diffraction section.

Next, diffraction functions in the optical element 122A will be described. FIG. 4 is an explanatory diagram of diffraction functions of the first diffraction section 21 and the second diffraction section 22. Additionally, in FIG. 4, for the convenience of description, illustration of the mirror 24 and the half mirror 23 has been omitted.

In addition, in FIG. 4, only first order and second order diffracted light that is created by the first diffraction section 21 and the second diffraction section 22 is illustrated. Furthermore, there are also cases in which higher order diffracted light also occurs, but these have been omitted in order to make the drawing easily viewable.

Firstly, in FIG. 4, laser light L is incident to the first diffraction section 21 at an angle θ1. In this case, the laser light L is diffracted by the first diffraction section 21, and a plurality of rays of diffracted light are introduced to the inner section of the light guide plate 20.

In FIG. 4, zero order diffracted light Lz, + second order diffracted light Lp2, + first order diffracted light Lp1, − first order diffracted light Lm1, and − second order diffracted Lm2 light are shown. Additionally, the number of rays (the order number) of diffracted light that is created varies depending on the grating periods P of the diffraction gratings.

Diffracted light that is introduced to the inside of the light guide plate 20 is diffracted again by the second diffraction section 22, and a diffracted light of a plurality of order numbers is emitted to the air from the respective diffracted light inside the light guide plate 20.

For example, as a result of being diffracted by the second diffraction section 22, the zero order diffracted light Lz that is due to the first diffraction section 21 causes diffracted light such as zero order diffracted light Lzz, + first order diffracted light Lzp1, − first order diffracted light Lzm1 to occur.

In this instance, the diffraction angle of the zero order diffracted light Lzz is of equal value to a refraction angle at an interface between air and the light guide plate 20. Therefore, in a case in which the incidence angle to the first diffraction section 21 is $\theta 1$, the diffraction angle of the zero order diffracted light Lzz that is emitted from the second diffraction section 22 is also $\theta 1$.

Next, the + first order diffracted light Lp1 that is due to the first diffraction section 21 will be focused on.

The + first order diffracted light Lp1 is diffracted by the second diffraction section 22, and causes diffracted light such as zero order diffracted light Lp1z, + first order diffracted light Lp1p1, − first order diffracted light Lp1m1, and − second order diffracted Lp1m2 to occur.

In the present embodiment, the grating period P of the second diffraction section 22 and the grating period P of the first diffraction section 21 are the same. Therefore, the diffraction powers of the first diffraction section 21 and the second diffraction section 22 are the same, and therefore, in a case in which the incidence angle to the first diffraction section 21 is $\theta 1$, the diffraction angle of the − first order diffracted light Lp1m1 that is emitted from the second diffraction section 22 is also $\theta 1$.

Next, the − first order diffracted light Lm1 that is due to the first diffraction section 21 will be focused on.

The − first order diffracted light Lm1 is diffracted by the second diffraction section 22, and causes diffracted light such as zero order diffracted light Lm1z, + first order diffracted light Lm1p1, and − first order diffracted light Lm1m1 to occur. In the abovementioned manner, since the diffraction powers of the first diffraction section 21 and the second diffraction section 22 are the same, in a case in which the incidence angle to the first diffraction section 21 is $\theta 1$, the diffraction angle of the + first order diffracted light Lm1p1 that is emitted from the second diffraction section 22 is also $\theta 1$.

In the manner mentioned above, according to the optical element 122A of the present embodiment, since the two diffraction sections, first diffraction section 21 and the second diffraction section 22, in which the grating period P is the same are provided, it is possible to create three rays of diffracted light that are emitted from a light emission surface (the second surface 20b) at the same angle as the incidence angle $\theta 1$ to the light incidence surface (the first surface 20a).

That is, for example, in the optical element 122A, if one ray of circular laser light L is incident thereto, it is possible to emit three rays of the same circular laser light, which are emitted at the same angle as the incidence angle.

More specifically, for example, in a case in which the wavelength of the laser light L that is incident is set to be 532 nm, the refractive index of the light guide plate 20 is set to be 1.52, the thickness of the light guide plate 20 is set to be 1.5 mm, and the grating period P of the first diffraction section 21 and the second diffraction section 22 is set to be 0.63 μm, when the incidence angle $\theta 1=0°$, it is possible to obtain three rays of the laser light L that are separated by 1 mm each at an emission diffraction angle of 0°.

Additionally, in combinations of higher order diffracted light, it is also possible to create a plurality of rays of diffracted light that are emitted at the same angle as the incidence angle, but such combinations are omitted in the description of FIG. 4. In addition, in a practical sense, unnecessary diffracted light that is diffracted at angles that differ from the incidence angle $\theta 1$ is also created.

In contrast to this, in the present embodiment, unnecessary diffracted light is suppressed by determining the depth of the grating patterns of the first diffraction section 21 and the second diffraction section 22 so that the diffraction efficiency with respect to higher order diffracted light is lower, or configuring so that higher order diffracted light is not created by setting the grating period P to be small.

Generally, the diffraction gratings diffract light in a direction, which has periodicity of the grating pattern that configures the diffraction grating. In FIG. 4, light is diffracted at a YZ plane. Therefore, even is the incidence angle $\theta 1$ varies within the YZ plane, it is possible to obtain a plurality of rays of laser light L in the same manner.

Additionally, in FIG. 4, a case in which the laser light L is a single wavelength is described. However, the image light G of the present embodiment includes a plurality of rays of laser light L of different wavelengths (red, blue and green).

Figure 5:
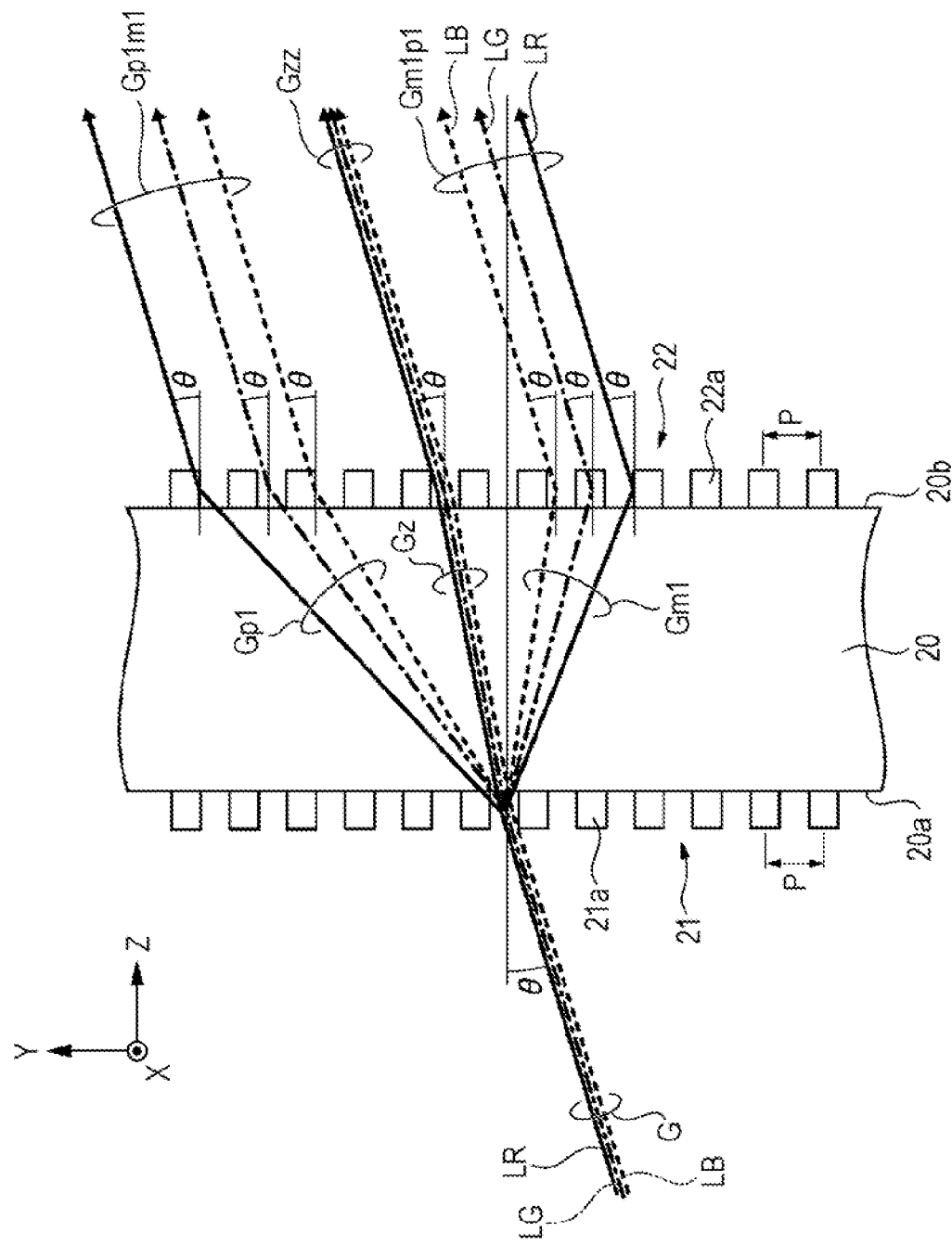
FIG. 5 is an explanatory diagram of diffraction functions of the first diffraction section and the second diffraction section with respect to image light.

Hereinafter, a case in which image light G that includes a plurality of rays of laser light L of different wavelengths is incident to the optical element 122A will be described using FIG. 5. FIG. 5 is an explanatory diagram of diffraction functions of the first diffraction section 21 and the second diffraction section 22 with respect to the image light G. Additionally, in FIG. 5, diffracted light that is unnecessary in the description is omitted.

In the present embodiment, as shown in FIG. 5, the image light G that includes rays of laser light L of red, green and blue wavelengths, is incident to the first diffraction section 21 at an angle $\theta$. Generally, since the diffraction angle that is due to the diffraction grating becomes larger as the wavelength is longer, a blue ray reaches the second diffraction section 22 at an angle that is smaller than that of a green ray, and a red ray reaches the second diffraction section 22 at an angle that is larger than that of a green ray.

In the present embodiment, since the grating period P of the second diffraction section 22 is the same as the grating period P of the first diffraction section 21, there is diffracted light that is diffracted at the same angle $\theta$ as the incidence angle and emitted to the outside of the light guide plate 20.

In FIG. 5, the image light G (blue laser light LB, red laser light LR and green laser light LG) is incident to the first diffraction section 21 at the angle $\theta$.

Zero order diffracted light Gz of the image light G that is due to the first diffraction section 21 is diffracted by the second diffraction section 22. At this time, in a case in which the incidence angle of the image light G to the first diffraction section 21 is $\theta$, the diffraction angle of zero order diffracted light Gzz of the image light G that is emitted from the second diffraction section 22 is also $\theta$.

+ First order diffracted light Gp1 of the image light G that is due to the first diffraction section 21 is diffracted by the second diffraction section 22. At this time, the diffraction angle of − first order diffracted light Gp1m1 of the image light G that is emitted from the second diffraction section 22 is also θ.

− First order diffracted light Gm1 of the image light G that is due to the first diffraction section 21 is diffracted by the second diffraction section 22. At this time, the diffraction angle of + first order diffracted light Gm1p1 of the image light G that is emitted from the second diffraction section 22 is also θ.

In this manner, according to the present embodiment, it is possible to create the three rays of diffracted light Gzz, Gp1m1 and Gm1p1 that are emitted from a light emission surface (the second surface 20b) at the same angle as the incidence angle θ to the light incidence surface (the first surface 20a) from one ray of the image light G that is incident to the light incidence surface. Additionally, in the blue laser light LB, the red laser light LR and the green laser light LG, respective intervals between diffracted light are greater in laser light with longer wavelengths (refer to FIG. 5).

Figure 6:
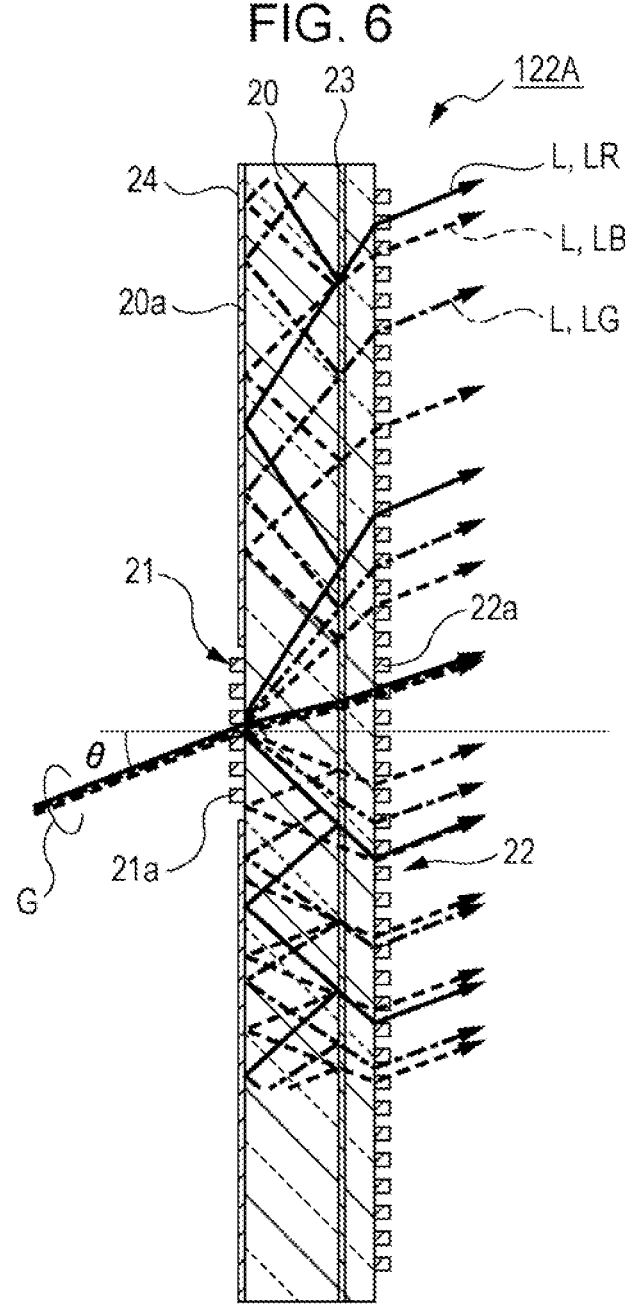
FIG. 6 is a view for describing an enlargement function of image light by the optical element.

Subsequently, an enlargement function of the image light G by the optical element 122A of the present embodiment will be described on the basis of the abovementioned theory. FIG. 6 is a view for describing an enlargement function of the image light G by the optical element 122A.

As shown in FIG. 6, the laser light L that is introduced to the inside of the light guide plate 20 as a result of diffraction by the first diffraction section 21, reaches the half mirror 23. A portion of the laser light L that reaches the half mirror 23 is transmitted through the half mirror 23 and emitted at the same angle as the incidence angle by the second diffraction section 22.

Meanwhile, laser light L that is reflected by the half mirror 23 reaches the mirror 24 that is formed on the first surface 20a of the light guide plate 20, is reflected thereat, and reaches the half mirror 23 again. In this manner, light that propagates through the light guide plate 20 and reaches the second diffraction section 22 is sequentially emitted at the same angle as the incidence angle while being repeatedly reflected by the half mirror 23 and the mirror 24, thereby performing duplication of emission light, that is, enlargement of the image light G.

Returning to FIG. 2, according to the image formation section 120A of the present embodiment, since the optical element 122A is provided, it is possible to emit the image light G that is formed from the laser light L in a state of being enlarged in the Y direction. The image light G that is emitted from the optical element 122A is incident to the light input section 30 that is provided on the first surface 31a of the light guide body 31 in the light guide unit 130A.

The light guide unit 130A guides the image light G that is captured from the light input section 30 while the image light G is totally reflected by the first surface 31a and the second surface 31b. The image light G propagates through the inside of the light guide body 31 as a result of being totally reflected by the first surface 31a and the second surface 31b, and is emitted from the light output section 32 that is provided at the other end side (the plus X direction side) of the first surface 31a. A portion of the image light G is emitted each time the image light G is input to the diffraction element 32a of the light output section 32.

The size of the light emission surface of the light output section 32 in the X direction is larger than the size of the light incidence surface of the light input section 30 in the X direction. Therefore, the size in the X direction of the image light G that is emitted from the light output section 32 is enlarged in comparison with that during incidence to the light input section 30. That is, the light guide unit 130A functions as an image light enlargement unit that enlarges the size in the horizontal direction (the X direction) of the image light G.

In addition, in the present embodiment, the grating pitch of the diffraction element 30a that is provided in the light input section 30 and the grating period P of the diffraction element 32a that is provided in the light output section 32 are the same. Therefore, the image light G that is emitted from the optical element 122A and incident to the light input section 30 (the diffraction element 30a) is emitted from the light output section 32 (the diffraction element 32a) at the same angle as the incidence angle.

In the abovementioned manner, according to the present embodiment, it is possible to enlarge the image light G in the vertical direction (the Y direction) by continually scanning with the laser light L and causing the laser light L to be incident to the optical element 122A. In addition, the image light G attains a state that is also enlarged in the horizontal direction (the X direction) as a result of being guided within the light guide unit 130A and emitted from the light output section 32. Accordingly, the image light G is emitted toward the left eye LE of a user in a state of being enlarged beyond a pupil diameter. The image light G that is emitted forms an image on the retina of the left eye LE of a user, and it is possible for the user to recognize the image.

In addition, in the abovementioned description, the configuration of the left eye display section 110A was described, but it is also possible to obtain the same effects with the right eye display section 110B. That is, according to the right eye display section 110B, the image light G is emitted toward the right eye of a user in a state of being enlarged beyond a pupil diameter, forms an image on the retina of the right eye, and it is possible for the user to recognize the image.

At least a portion of light that is incident to the viewing sections 131A and 131B, which include the light output sections 32, from the periphery thereof is transmitted through the viewing sections 131A and 131B, and is guided to the left eye LE and the right eye of a user. As a result of this, a user can see the image light G that is formed by the image formation sections 120A and 120B, and optical images from the outside world superimposed on one another.

As a result of mounting the main body section 100 of the mounted display apparatus 1000 on a head section, a user recognize images (virtual images) that correspond to image light that is output from the main body section 100. In addition, it is possible for a user to see the outside world through the viewing sections 131A and 131B of the main body section 100 with the main body section 100 mounted on a head section.

In addition, the mounted display apparatus 1000 can allow a user to view the image light G that is enlarged beyond a pupil diameter. Accordingly, it is not necessary for a user to perform adjustment that exactly matches display positions of images to a position of a pupil. Therefore, the mounted display apparatus 1000 has excellent usability.

In addition, the length of the optical element 122A in the vertical direction (the Y direction) coincides with the length of the light guide body 31 in the Y direction. Therefore, since the optical element 122A does not jut out from the light guide body 31, miniaturization of the optical element 122A is possible. Accordingly, miniaturization of the mounted display apparatus 1000 that is provided with the optical element 122A is realized.

Additionally, in the present embodiment, a case in which the first diffraction section 21 is formed across the entire area of the first surface 20a in the X direction was given as an example, but the width of the first diffraction section 21 in the X direction may be less than the width of the first surface 20a in the X direction. In this case, a region that is not covered by the first diffraction section 21 is covered by the mirror 24.

Second Embodiment

Next, an optical element according to a second embodiment of the invention will be described. The present embodiment includes a feature in a manufacturing method of an optical element. Additionally, the same names are given to the same structures as the first embodiment, and detailed description thereof is omitted.

Figure 7:
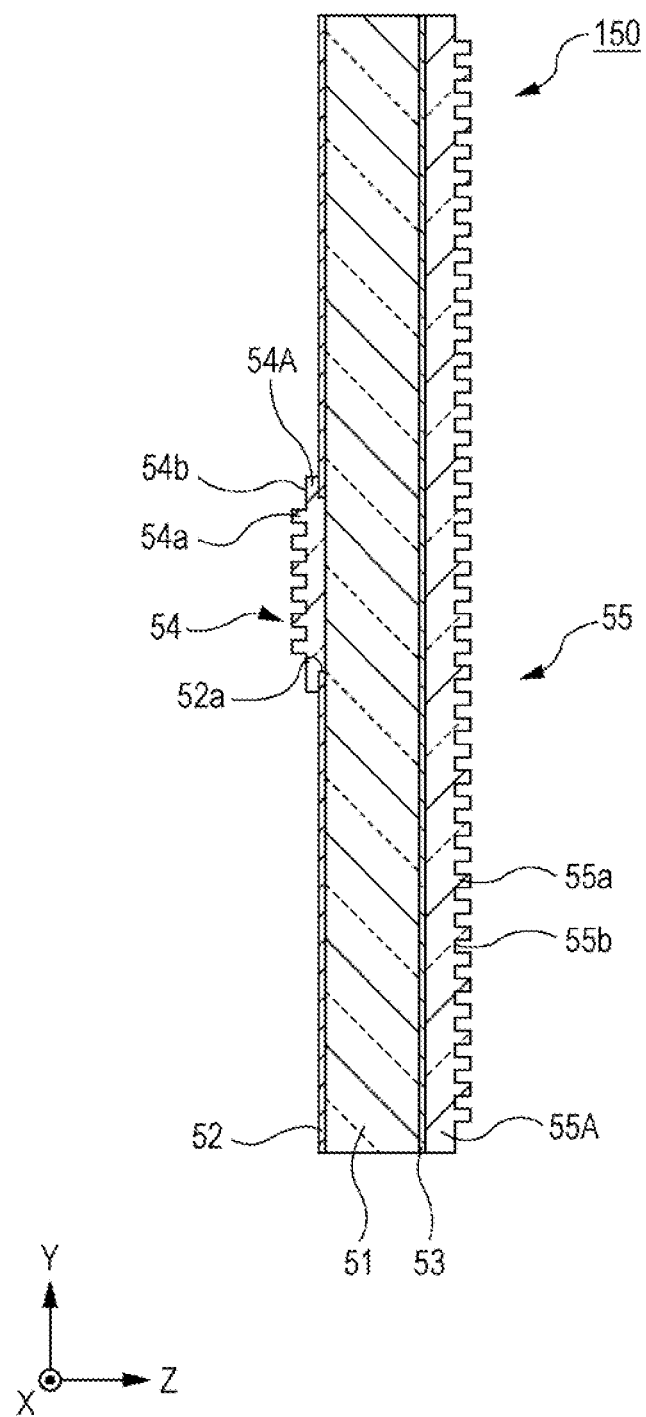
FIG. 7 is a view that shows a cross-sectional configuration of an optical element according to a second embodiment.

FIG. 7 is a view that shows a cross-sectional configuration of an optical element 150 according to a second embodiment.

As shown in FIG. 7, an optical element 150 of the present embodiment includes a transparent substrate (a light guide body) 51, a first diffraction section 54, a second diffraction section 55, a half mirror 53, a mirror 52, a first base section 54A, and a second base section (a resin layer) 55A.

In the present embodiment, a glass substrate in which the parallelization of both surfaces is ensured are used as the transparent substrate 51.

The first diffraction section 54 and the second diffraction section 55 are, for example, configured from surface relief type diffraction gratings. The first diffraction section 54 has a linear grating pattern 54a that extends in the X direction. The second diffraction section 55 has a linear grating pattern 55a that extends in the X direction in the same manner as the first diffraction section 54. The grating periods of the grating patterns 54a and 55a are mutually the same in the same manner as the first embodiment.

That is, in the first diffraction section 54 and the second diffraction section 55 of the present embodiment, the respective arrangement pitches of the grating patterns 54a and 55a are mutually equivalent with one another, and the respective extension directions (the X direction) of the gratings that configure the grating patterns 54a and 55a mutually coincide with one another.

The half mirror 53 is provided across the entirety of one surface of the transparent substrate 51.

The second base section 55A is laminated on the half mirror 53 in a manner that covers the half mirror 53. The second base section 55A is configured from an optically transmissive resin material.

The second diffraction section 55 is formed integrally with the second base section 55A using an imprinting method such as one that will be described later. That is, the second base section 55A includes a second surface 55b, and the grating pattern 55a of the second diffraction section is formed on the second surface 55b.

The mirror 52 is provided on a surface on a side of the transparent substrate 51 that is opposite to the half mirror 53. In the mirror 52, an opening 52a is formed in the center of the transparent substrate 51 in the Y direction.

The first base section 54A is laminated on the mirror 52 in a manner that covers the opening 52a. The first base section 54A is configured from an optically transmissive resin material.

The first diffraction section 54 is formed integrally with the first base section 54A using an imprinting method such as one that will be described later. That is, the first base section 54A includes a first surface 54b, and the grating pattern 54a of the first diffraction section is formed on the first surface 54b.

Next, a manufacturing method of the optical element 150 of the present embodiment will be described. FIGS. 8A to 8G are views that show a manufacturing process of the optical element 150 of the present embodiment.

Firstly, as shown in FIG. 8A, the mirror 52 which includes the opening 52a and the half mirror 53 are respectively formed on each surface of the transparent substrate 51. The mirror 52 and the half mirror 53 are, for example, formed using a publicly known method of the related art such as a sputtering method.

Next, as shown in FIG. 8B, the opening 52a is coated with a resin material in a manner that covers the opening 52a. Next, as shown in FIG. 8C, the resin material is cured after pressing a first mold member (a first mold member) 60 onto the first base section 54A. Thereafter, the first mold member 60 is removed, and as shown in FIG. 8D, the first diffraction section 54 is formed. In this instance, concave sections 60a that are formed from an inverse pattern to the grating pattern 54a that configures the first diffraction section 54, are formed in the first mold member 60. Therefore, when the first mold member 60 is pressed down, the grating pattern 54a is simply and reliably formed in the first base section 54A.

Next, as shown in FIG. 8E, the half mirror 53 is coated with a resin material in a manner that covers the half mirror 53. Next, as shown in FIG. 8F, the resin material is cured after pressing a second mold member (a second mold member) 61 onto the second base section 55A. Subsequently, the second mold member 61 is removed, and as shown in FIG. 8G, the second diffraction section 55 is formed. In this instance, concave sections 61a that are formed from an inverse pattern to the grating pattern 55a that configures the second diffraction section 55, are formed in the second mold member 61. Therefore, when the second mold member 61 is pressed down, the grating pattern 55a is simply and reliably formed in the second base section 55A.

In the abovementioned manner, it is possible to manufacture the optical element 150 of the present embodiment.

According to the present embodiment, since it is possible to form the first base section 54A using the opening 52a that has a predetermined size, and the position of which is determined, as a reference, it is possible to form the first base section 54A with high precision. As a result of this, the positional precision of the first diffraction section 54 that is formed on the first base section 54A by imprinting, is also high, and therefore, it is possible to configure a highly reliable first diffraction section 54.

According to the present embodiment, since a glass substrate in which the parallelization of both surfaces is ensured, is used as the transparent substrate 51, it is possible to configure such that the mirror 52 and the half mirror 53, which are formed on both surfaces of the transparent substrate 51 are disposed facing one another with high parallelization.

Accordingly, since a propagation angle within the substrate, which corresponds to the incidence angle, is retained when the light that is introduced into the transparent substrate 51 is repeatedly reflected inside the transparent substrate 51, it is possible to favorably enlarge image light, and emit the image light to the outside.

In addition, since the diffraction elements are formed using imprinting of a resin material, the resin material (the second base section 55A) attains a state of being disposed between the grating pattern 55a of the second diffraction section 55 and the half mirror 53. As a result of this, since a circumstance in which the grating pattern 55a and the half mirror 53 attain a state of coming into contact with one another, is prevented, it is possible to reliably reflect a portion of light that is incident to the half mirror 53, and return the light to the inside. Accordingly, it is possible to exhibit an image enlargement function that only emits light that is transmitted through the resin material and reaches the grating pattern 55*a* while realizing repeated reflection of light inside the transparent substrate 51.

Third Embodiment

Next, an optical element according to the third embodiment of the invention will be described. The difference between the present embodiment and the first embodiment is the optical characteristics of the half mirror 23, and other configurations are common to both embodiments. Therefore, the description below will be given focusing on the optical characteristics of the half mirror 23.

Figure 9A:
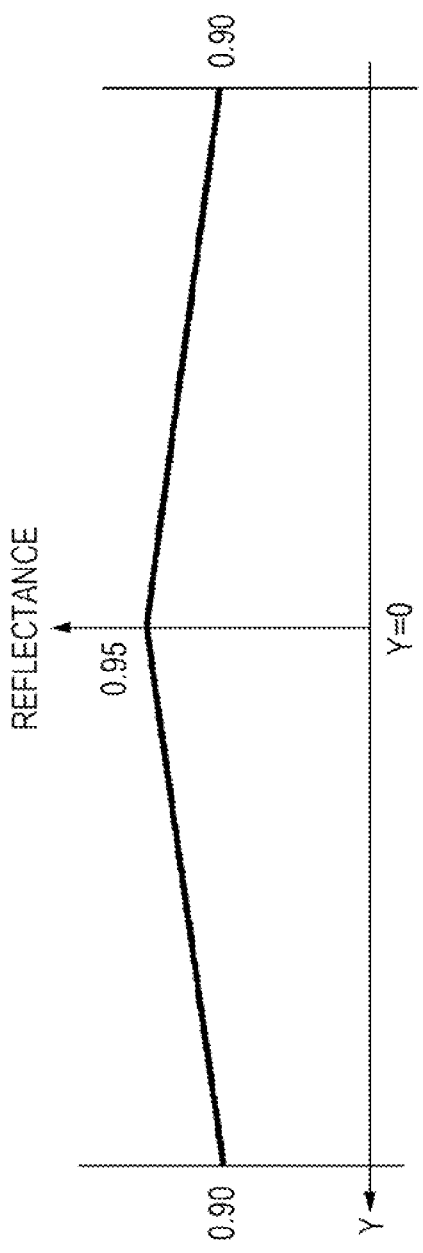
FIGS. 9A and 9B are views that show optical characteristics of a half mirror according to a third embodiment.
Figure 9B:
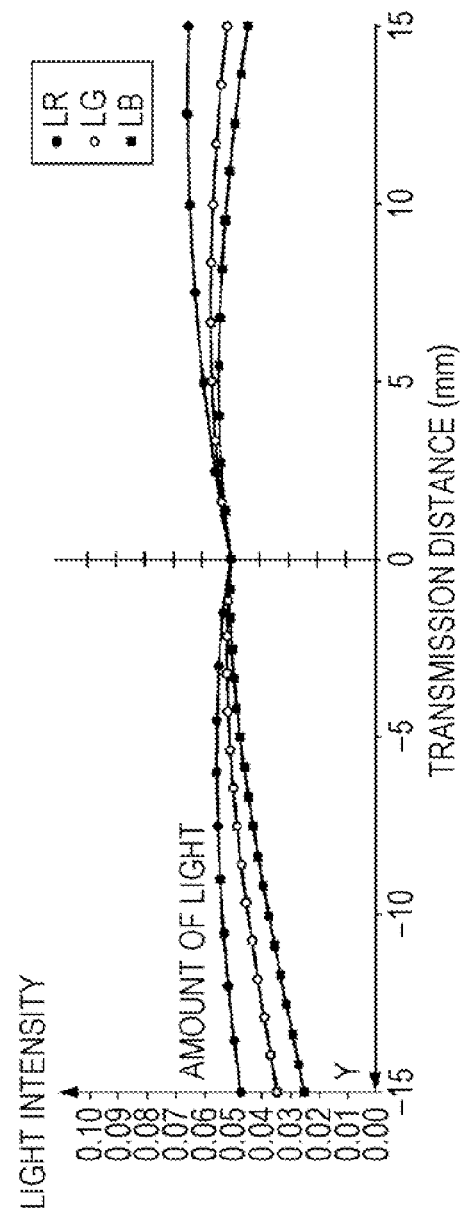

FIGS. 9A and 9B are views that show optical characteristics of a half mirror of the present embodiment, FIG. 9A is a graph that shows changes in the reflectance of the half mirror, and FIG. 9B is a graph that shows the intensity of image light that is emitted from the second diffraction section 22. Additionally, in FIG. 9B, the light intensity of laser light that is emitted to the outside is shown within a range of ±15 mm with respect to the center (Y=0) of the half mirror. In addition, in FIG. 9B, each light intensity of the blue laser light LB, the red laser light LR and the green laser light LG that configure the image light is shown.

In this instance, in a case in which the reflectance of the half mirror 23 is fixed in the Y direction of the light guide plate 20, deteriorations in the light intensity with which light propagates inside the light guide plate 20 are large, and therefore, the intensity of emission light falls greatly in accordance with separation from the first diffraction section 21 in the Y direction.

In contrast to this, in the present embodiment, the reflectance of the half mirror 23 gradually decreases with separation from a central optical axis of the first diffraction section 21 in the Y direction. In this instance, the central optical axis of the first diffraction section 21 passes through the center of the first diffraction section 21 in the Y direction, and refers to an optical axis that is parallel to the Z direction.

As shown in FIG. 9A, in the half mirror 23 of the present embodiment, in a case in which the reflectance of the center (Y=0) is 0.95, the reflectance gradually decreases to 0.90 at end sections in the Y direction.

As the formation material of the half mirror 23, it is preferable to use a dielectric multilayered film in which the absorption of light is low in comparison with a metal film, and which can suppress deteriorations in light intensity during repeated reflection and propagation of the light inside the light guide plate 20. As the dielectric multilayered film, for example, a dielectric multilayered film with a structure in which optical thin films with different refractive indices such as SiO$_2$ (silicon oxide) and TiO$_2$ (titanium oxide), are sequentially laminated is used.

In order to change the reflectance or the transmittance of the dielectric multilayered film for each location, it is suitable to perform film formation in a manner in which the film thickness of each layer that configures the dielectric multilayered film gradually changes depending on the location. Additionally, an extremely thin metal thin film may also be used as the half mirror 23, and in this case, it is possible to adjust the reflectance and the transmittance in the Y direction by performing film formation in a manner in which the film thickness gradually changes.

According to the present embodiment that is described above, as a result of returning as much light that propagates through the light guide plate 20 as possible when light is reflected by the half mirror 23, it is possible for a large amount of light to remain in the light guide plate 20 even if light is separated from the central optical axis of the first diffraction section 21.

In addition, it is possible to configure so that the transmittance of half mirror 23 gradually increases with separation from the central optical axis of the first diffraction section 21 in the Y direction. Therefore, it is possible to transfer a larger amount of light that remains in the light guide plate 20 to a second diffraction section 22 side, and therefore, it is possible to suppress deteriorations in emitted light intensity even if light is separated from the first diffraction section 21 in the Y direction.

Accordingly, as shown in FIG. 9B, scatter in the light intensity of the blue laser light LB, the red laser light LR and the green laser light LG that configure the image light is suppressed within a predetermined range (light intensity is 0.025 to 0.06). That is, it is possible to make the light intensity that is emitted to the outside from the second diffraction section 22 largely uniform in the Y direction.

Additionally, as shown in FIG. 9B, strictly speaking, scatter in light intensity occurs to some extent in each color of the blue laser light LB, the red laser light LR and the green laser light LG.

The reason for this is that, as shown in FIG. 6, in the laser light L that is diffracted by the first diffraction section 21, the diffraction angle becomes smaller as the wavelength is shorter.

The incidence angle with respect to the half mirror 23 and the mirror 24 of the blue laser light LB for which the wavelength is short, is small, and a number of times of being reflected by the half mirror 23 and the mirror 24 while propagating through the light guide plate 20 is greater than that of red laser light LR. In this manner, if the number of reflection times by the half mirror 23 and the mirror 24 increases, the intensity decreases rapidly during propagation through the light guide plate 20.

In such an instance, the light intensity that returns to the light guide plate 20 may be set to be higher by setting the reflectance with respect to the blue laser light LB, the number of reflection times of which is high, to be higher than the reflectance with respect to the red laser light LR in at least one of the half mirror 23 and the mirror 24.

That is, the light intensity that returns to the light guide plate 20 may be set to be higher by setting the reflectance with respect to incidence light with a small incidence angle to be higher than the reflectance with respect to incidence light with a large incidence angle in at least one of the half mirror 23 and the mirror 24.

Fourth Embodiment

Next, an optical element according to the fourth embodiment of the invention will be described. The difference between the present embodiment and the first embodiment is the structure of the optical element, and other configurations are common to both embodiments. Therefore, the description below will be given focusing on structure of the optical element.

FIGS. 10A to 10C are views that show an overall configuration of an optical element 80 of the present embodiment, FIG. 10A is a cross-sectional view of the optical element 80, FIG. 10B is a plan view in which the optical element 80 is viewed from a light incidence surface side (a −Z direction), and FIG. 10C is a plan view in which the optical element 80 is viewed from a light emission surface side (a +Z direction).

As shown in FIG. 10A, the optical element 80 of the present embodiment includes the light guide plate 20, a first diffraction section 70, a second diffraction section 73, the half mirror 23, and the mirror 24.

As shown in FIGS. 10A and 10B, the first diffraction section 70 and the mirror 24 are provided on the first surface 20a of the light guide plate 20. The first diffraction section 70 is provided in the center of the first surface 20a. The mirror 24 is formed over the entirety of the first surface 20a so as to cover a region that surrounds the periphery of the first diffraction section 70, that is, a region that does not overlap with the first diffraction section 70 in a plan view.

As shown in FIGS. 10A and 100, the second diffraction section 73 is provided across the entire surface of the second surface 20b of the light guide plate 20.

The first diffraction section 70 and the second diffraction section 73 are, for example, configured from surface relief type diffraction gratings.

As shown in FIG. 10B, the first diffraction section 70 has a grating pattern 71 with a crossed grating form that extends two-dimensionally in the X and Y directions. The grating pattern 71 includes a plurality of first patterns (a first grating pattern) 71a that extend along the X direction, and a plurality of second patterns (a third grating pattern) 71b that extend along the Y direction. The grating period (the arrangement pitch) of the first patterns 71a is PY. The grating period (the arrangement pitch) of the second patterns 71b is PX. Additionally, each grating period PY and PX in the first patterns 71a and the second patterns 71b may be the same or may be different.

In this instance, if the grating periods PY and PX in the first patterns 71a and the second patterns 71b are made to be different, since the diffraction angles in the vertical direction (the Y direction) and the horizontal direction (the X direction) differ, the vertical and horizontal enlargement ratios of the image light G when emitted from the optical element 80 differ. Meanwhile, if the grating periods PY and PX are set to be the same, it is possible perform uniform vertical and horizontal enlargement by setting the vertical and horizontal enlargement ratios of the image light G to be the same.

As shown in FIG. 10C, the second diffraction section 73 has a grating pattern 74 with a crossed grating form that extends two-dimensionally in the X and Y directions, similarly to the first diffraction section 70. The grating pattern 74 includes a plurality of first patterns (a second grating pattern) 74a that extend along the X direction, and a plurality of second patterns (a fourth grating pattern) 74b that extend along the Y direction. The grating period (the arrangement pitch) of the first patterns 74a is the same PY as that of the first patterns 71a of the first diffraction section 70. The grating period (the arrangement pitch) of the second patterns 74b is the same PX as that of the second patterns 71b of the first diffraction section 70. That is, the size of the second diffraction section 73 is larger than that of the first diffraction section 70 in a state of being viewed in plan view.

Additionally, the depth of each grating pattern is determined as appropriate depending on a wavelength that is used and a required diffraction efficiency.

That is, in the first diffraction section 70 and the second diffraction section 73 of the present embodiment, the respective arrangement pitches of the grating patterns 71 and 74 are mutually equivalent with one another, and the respective extension directions (the X and Y directions) of the gratings that configure the grating patterns 71 and 74 mutually coincide with one another.

According to the optical element 80 of the present embodiment, since the first diffraction section 70 and the second diffraction section 73 are provided, it is possible to realize an enlargement function of image light, which it is only possible to obtain in the vertical direction (the Y direction) in the optical element 122A of the first embodiment, in both directions of the vertical direction (the Y direction) and the horizontal direction (the X direction) in a state in which the incidence angle is maintained.

In this manner, according to the optical element 80 of the present embodiment, it is possible to set a state in which the image light G is enlarged in the vertical direction (the Y direction) and the horizontal direction (the X direction).

Accordingly, in the present embodiment, for example, in a case in which the light guide unit 130A that is shown in FIG. 2 is used, it is not necessary to enlarge the image light G in the horizontal direction (the X direction) using the light guide unit 130A. In addition, in the light guide unit 130A of the first embodiment, the diffraction elements 30a and 32a are used as the light input section 30 and the light output section 32 in order to obtain the image enlargement function in the horizontal direction (the X direction) in the light guide unit 130A. In contrast to this, in the present embodiment, since in the abovementioned manner, the image enlargement function in the light guide unit 130A is not necessary, it is not necessary to use the diffraction element as the light input section 30 and the light output section 32, and therefore, for example, a mirror and a prism may be used.

The embodiments of the invention have been described above, but the invention is not limited to the abovementioned content, and can be changed as appropriate within a range that does not depart from the gist of the invention.

For example, the electro-optical device of the invention is not limited to transmission type head mounted displays, and may be adopted in an immersion type head mounted display. In addition, the invention can be used in a projection type projector and other virtual image displays that use optical elements. In addition, as electronic instruments to which the electro-optical device of the invention can be applied, it is possible to exemplify a head mounted display or a false window that displays scenery videos inside a frame that resembles a window.

The entire disclosure of Japanese Patent Application No. 2014-220034, filed Oct. 29, 2014 is expressly incorporated by reference herein.

What is claimed is:

1. An optical element comprising:
   a first light guide that is provided with a first incidence section and a first emission section;
   a semitransmissive reflective film that is provided in the inside of the first light guide;
   a first diffraction element that is provided in a section of the first incidence section, and is provided with a plurality of gratings, which are arranged at a predetermined pitch;
   a second diffraction element that is provided in at least a section of the first emission section, and is provided with a plurality of gratings, which are arranged at a predetermined pitch; and
   a reflective film that is provided in the first incidence section in a periphery of the first diffraction element,
   wherein the pitch of the plurality of gratings of the first diffraction element is provided so as to be equivalent to the pitch of the plurality of gratings of the second diffraction element,
   wherein each extension direction of the plurality of gratings of the first diffraction element is provided so as to be the same direction as each extension direction of the plurality of gratings of the second diffraction element,
   wherein the first and second diffraction elements are arranged on opposed sides of the first light guide and disposed in a same direction and having at least portions thereof overlapping in the direction that the first and second diffraction elements are disposed, and wherein the reflectance of the semitransmissive reflective film gradually decreases with separation from a central optical axis of the first diffraction element.

2. The optical element according to claim 1,
wherein the semitransmissive reflective film is provided so as to be parallel to a surface of the first incidence section and a surface of the first emission section.

3. The optical element according to claim 1,
wherein the plurality of gratings of the first diffraction element are arranged along a first direction,
wherein the plurality of gratings of the second diffraction element are arranged along the first direction, and
wherein a size of the second diffraction element along the first direction is greater than the size of the first diffraction element along the first direction.

4. The optical element according to claim 1,
wherein the semitransmissive reflective film is configured from a dielectric multilayered film.

5. The optical element according to claim 1, further comprising a resin layer that is disposed between the second diffraction element and the semitransmissive reflective film.

6. An electro-optical device comprising an image projection section including
an image generation section that emits image light,
a second light guide, which includes a second incidence section and a second emission section that are formed on one surface side of the second light guide, and which guides light that is input from the second incidence section, and outputs the light from the second emission section, and
the optical element according to claim 1, which is disposed facing the second incidence section, and to which the image light from the image generation section is incident.

7. The electro-optical device according to claim 6,
wherein the optical element is disposed in a state in which the first emission section is inclined with respect to a surface of the second incidence section.

8. A mounted display apparatus comprising:
the electro-optical device according to claim 6; and
a mounting section.

9. An optical element comprising:
a first light guide that is provided with a first incidence section and a first emission section;
a semitransmissive reflective film that is provided in the inside of the first light guide;
a first diffraction element that is provided in a section of the first incidence section, and is provided with a plurality of gratings, which are respectively arranged at a predetermined pitch so as to extend along a first direction and a second direction, which is a direction that intersects the first direction;
a second diffraction element that is provided in at least a section of the first emission section, and is provided with a plurality of gratings, which are respectively arranged at a predetermined pitch so as to extend along the first direction and the second direction; and a reflective film that is provided in the first incidence section in a periphery of the first diffraction element, wherein the pitch of the plurality of gratings of the first diffraction element along the first direction is provided so as to be equivalent to the pitch of the plurality of gratings of the second diffraction element along the first direction, wherein the pitch of the plurality of gratings of the first diffraction element along the second direction is provided so as to be equivalent to the pitch of the plurality of gratings of the second diffraction element along the second direction, wherein a size of the second diffraction element is greater than the size of the first diffraction element, wherein the first and second diffraction elements are arranged on opposed sides of the first light guide and disposed in a same direction and having at least portions thereof overlapping in the direction that the first and second diffraction elements are disposed, and wherein the reflectance of the semitransmissive reflective film gradually decreases with separation from a central optical axis of the first diffraction element.

10. An electro-optical device comprising an image projection section including
an image generation section that emits image light,
a second light guide, which includes a second incidence section and a second emission section that are formed on one surface side of the second light guide, and which guides light that is input from the second incidence section, and outputs the light from the second light emission section, and
the optical element according to claim 9, which is disposed facing the second incidence section, and to which the image light from the image generation section is incident.

11. A mounted display apparatus comprising:
the electro-optical device according to claim 10; and
a mounting section.

12. The electro-optical device according to claim 10,
wherein the optical element is disposed in a state in which the first emission section is inclined with respect to a surface of the second incidence section.

13. The optical element according to claim 9,
wherein the semitransmissive reflective film is provided so as to be parallel to a surface of the first incidence section and a surface of the first emission section.

14. The optical element according to claim 9,
wherein the plurality of gratings of the first diffraction element are arranged along the first direction,
wherein the plurality of gratings of the second diffraction element are arranged along the first direction, and
wherein a size of the second diffraction element along the first direction is greater than the size of the first diffraction element along the first direction.

15. The optical element according to claim 9, further comprising a resin layer that is disposed between the second diffraction element and the semitransmissive reflective film.

* * * * *